US009348669B2

United States Patent
Knichel et al.

(10) Patent No.: US 9,348,669 B2
(45) Date of Patent: May 24, 2016

(54) USER INTERFACE FRAMEWORK

(71) Applicant: Google Inc., Mountain View, CA (US)

(72) Inventors: Mark David Knichel, Mountain View, CA (US); Fengjia Li, San Francisco, CA (US); Malte Ubl, San Francisco, CA (US)

(73) Assignee: Google Inc., Mountain View, CA (US)

( * ) Notice: Subject to any disclaimer, the term of this patent is extended or adjusted under 35 U.S.C. 154(b) by 48 days.

(21) Appl. No.: 14/101,305

(22) Filed: Dec. 9, 2013

(65) Prior Publication Data

US 2015/0160987 A1  Jun. 11, 2015

(51) Int. Cl.
*G06F 9/54* (2006.01)
*G06F 9/44* (2006.01)

(52) U.S. Cl.
CPC .............. *G06F 9/542* (2013.01); *G06F 9/4443* (2013.01)

(58) Field of Classification Search
CPC ............................... G06F 9/542; G06F 9/4443
See application file for complete search history.

(56) References Cited

U.S. PATENT DOCUMENTS

| 7,424,671 | B2 | 9/2008 | Elza et al. | |
| 8,407,319 | B1* | 3/2013 | Chiu et al. | 709/219 |
| 2003/0135825 | A1 | 7/2003 | Gertner et al. | |
| 2007/0169011 | A1* | 7/2007 | Ramani et al. | 717/136 |
| 2009/0210781 | A1 | 8/2009 | Hagerott | |
| 2010/0125854 | A1* | 5/2010 | Narumanchi et al. | 719/313 |
| 2010/0332968 | A1* | 12/2010 | Squillace | 715/234 |
| 2011/0029899 | A1* | 2/2011 | Fainberg et al. | 715/760 |
| 2011/0264787 | A1* | 10/2011 | Mickens et al. | 709/224 |
| 2012/0297399 | A1 | 11/2012 | Beaver | |
| 2014/0053063 | A1* | 2/2014 | Cirrincione et al. | 715/235 |
| 2015/0100879 | A1* | 4/2015 | Nandagopal et al. | 715/235 |

FOREIGN PATENT DOCUMENTS

WO    2013023143 A1    7/2013

OTHER PUBLICATIONS

Ben Nadel, Creating AngularJS Controllers with instance method, Sep. 12, 2012, pp. 1-26.*
Gregor Richards et al, "An Analysis of the Dynamic Behavior of Javascript Programs", Jun. 5, 2010, PLDI '10 Proceedings of the 2010 ACM.
International Search Report and Written Opinion dated Mar. 19, 2015 for PCT/US2014/069152.

* cited by examiner

*Primary Examiner* — Syed Roni

(57) ABSTRACT

Systems, methods and computer readable media for user interface frameworks are disclosed. In some implementations, the method can include detecting, at a dispatcher within a user interface framework, an event emitted from a user interface element contained within a document object model node associated with a controller. The method can also include requesting a module associated with the controller and instantiating the controller. The method can further include providing the event to the controller.

17 Claims, 4 Drawing Sheets

USER INTERFACE FRAMEWORK

FIELD

Some implementations relate generally to user interface frameworks and, more particularly, to methods, systems and computer readable media for document object model (DOM) user interface frameworks.

BACKGROUND

Some user interface (UI) models include, and may require, the use of UI software components for both rendering the UI and handling user interaction with the UI. Also, in some UI models, software components associated with the UI may be created and initialized at load time (e.g., at the load time of a web page), which may cause the page to load slowly and use memory for components that may not be needed when the page first loads (or may not be needed at all) depending on user interaction with the UI. Further, some UI models may require code to set up elements, create objects and listen for events. Such code can increase the page size of files, reduce the readability of the page source code (e.g., HTML) and may increase the load time of a page having code.

SUMMARY

Some implementations can include a method. In some implementations, the method can include detecting, at a dispatcher within a user interface framework, an event emitted from a user interface element contained within a document object model node associated with a controller. The method can also include requesting a module associated with the controller and instantiating the controller. The method can further include providing the event to the controller.

The controller can be associated with the document object model node via a declaration in a mark-up language portion of the document model object code containing the node. Instantiating the controller can include automatically instantiating the controller in response to the first occurrence of the event.

The method can also include specifying the controller as optional, wherein when the controller is specified as optional and cannot be located by the user interface framework; the user interface framework does not raise an error based on the controller not being found. The controller can include one or more arguments passed to the controller when the controller is called. The arguments can include one or more of a statement in a declaration of the controller within code declaring the document object model node; a shared object within a data model accessible by controllers within the document object model; and a context.

The document object model node can include an attribute defining the module and specifying that the module be loaded prior to instantiating the controller. An instance of the controller can be cached in a root node of the controller. The method can further include removing the controller instance when the document object model node instance is destroyed.

Some implementations can include a system having one or more processors configured to perform operations. The operations can include detecting, at a dispatcher within a user interface framework, an event emitted from a user interface element contained within a document object model node associated with a controller. The operations can also include requesting a module associated with the controller. The operations can further include instantiating the controller and providing the event to the controller.

The controller can be associated with the document object model node via a declaration in a mark-up language portion of the document model object code containing the node. Instantiating the controller can include automatically instantiating the controller in response to the first occurrence of the event. The operations can further comprise specifying the controller as optional, wherein when the controller is specified as optional and cannot be located by the user interface framework, the user interface framework does not raise an error based on the controller not being found.

The controller can include one or more arguments passed to the controller when the controller is called, the arguments can include one or more of a statement in a declaration of the controller within code declaring the document object model node, a shared object within a data model accessible by controllers within the document object model, and a context. The document object model node includes an attribute defining the module and specifying that the module be loaded prior to instantiating the controller. The operations can further comprise removing the controller instance when the document object model node is destroyed.

Some implementations can include a nontransitory computer readable medium having software instructions stored there on that, when executed by a processor, cause the processor to perform operations. The operations can include detecting, at a dispatcher within a user interface framework, an event emitted from a user interface element contained within a document object model node associated with a controller. The operations can also include requesting a module associated with the controller and instantiating the controller. The operations can further include providing the event to the controller.

The controller can be associated with the document object model node via a declaration in a mark-up language portion of the document model object code containing the node. Instantiating the controller can include automatically instantiating the controller in response to the first occurrence of the event.

The document object model node can include an attribute defining the module and specifying that the module be loaded prior to instantiating the controller. The operations can further comprise removing the controller instance when the document object model node is destroyed.

DETAILED DESCRIPTION

Systems, methods and computer readable media for user interface frameworks are disclosed. In general, in some implementations, the systems, methods and computer readable media can include a UI framework written in a language, such as Javascript or the like that compatible with web page mark-up languages such as hypertext mark-up language (HTML), extensible mark-up language (XML) or the like.

Some implementations can include a template-rendered UI in which the UI controllers are responsible for handling user interaction, while rendering is performed via templates. Also, the UI controllers can be configured to work with both server- and client-rendered HTML or other mark-up languages.

The UI framework can include controllers that are instantiated by declaring them in the template using a mark-up language or scripting language attribute such as controller or the like. Interfaces connecting controllers can be declaratively specified as well.

Also, the UI controllers can be configured to handle asynchronous actions such as user events, late-loaded services, and server data requests. The framework can include a dependency-injection style of programming which permits a controller (or even a method of a controller) to specify what needs to happen before that controller is invoked. Thus, some of the complexities typically associated with asynchronous programming are absorbed into the framework.

UI controllers as described herein do not have to be initialized or even created in order to listen for events. A controller can be constructed automatically the first time an event is sent to it. Thus, the creation and/or initialization of a controller does not have to occur at page load time, allowing for a smaller initial download size as compared to some conventional UI frameworks. The UI framework as described herein may be particularly well suited to web applications having many complex pages that display large amounts of content.

The sometimes complex relationships between objects can be specified declaratively in the document object model (DOM) code rather than being constructed imperatively at application startup time. The setup phase for controllers can happen as needed and "just in time."

Figure 1:
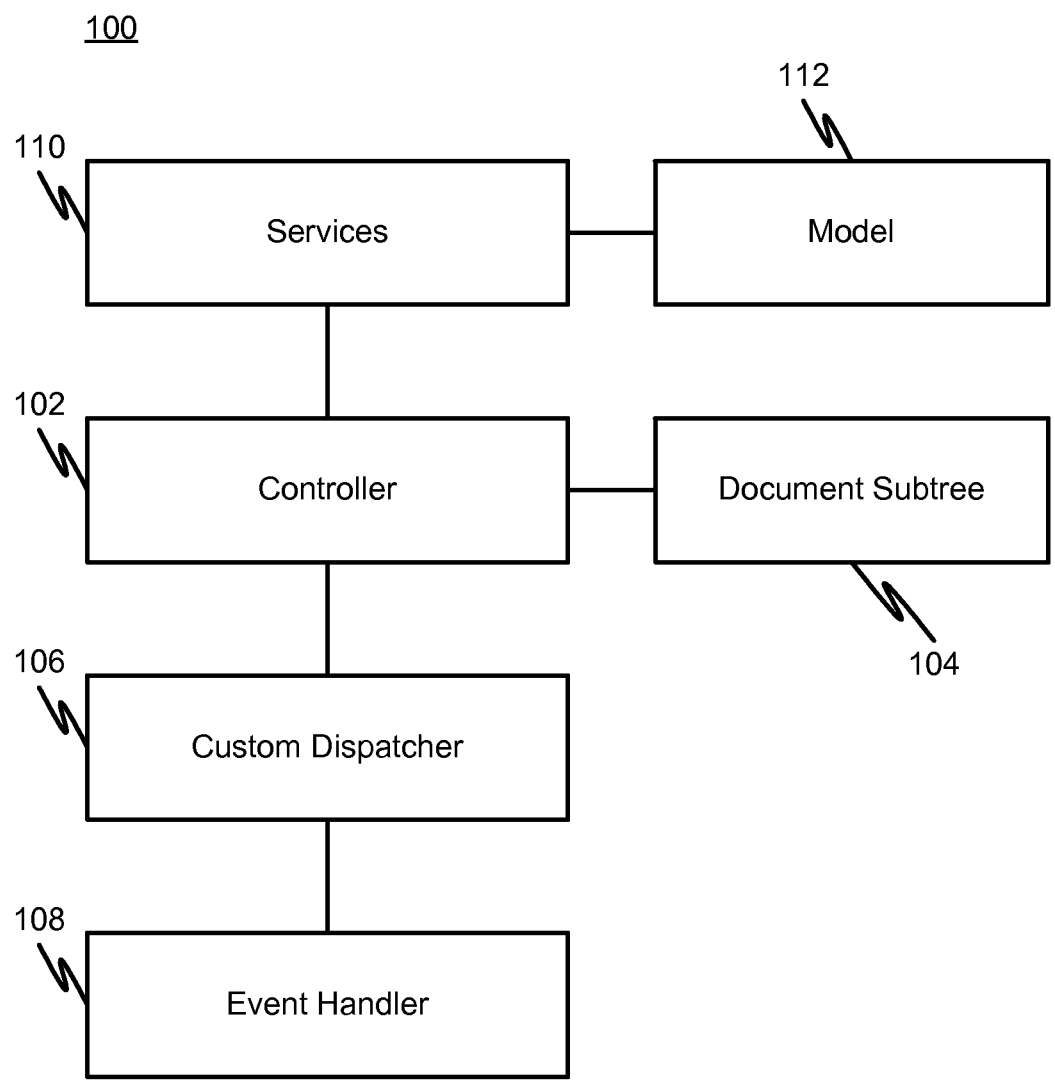
FIG. 1 shows an example system for user interface frameworks in accordance with some implementations.

FIG. 1 shows an example system 100 for user interface frameworks having a controller 102 that manages a document subtree 104 (e.g., a subtree of a DOM), handles UI events and communicates with a data model 112 exposed through services 110. Alternatively, the controller 102 can communicate directly with the data model 112. Also, the data model 112 can manage the document subtree 104. The controller 102 and/or data model 112 can be implemented, for example, as a JavaScript object bound to an HTML subtree. Events that occur in the subtree may be handled by the controller 102, specified through an event handler 108 via HTML attributes. A custom dispatcher 106 maps event handlers (e.g., 108) to controllers (e.g., 102), manages their lifecycle and calls methods on them.

A simple example of an HTML fragment having a controller declaration is shown below for illustration purposes:

```
<div>
    <div controller="foo.SampleController" data-userid="1234">
        <button action="click:handleClick">Click Me</button>
        <div jsname="status"></div>
    </div>
</div>
```

An example of a JavaScript corresponding to the above HTML fragment is shown below:

```
foo.SampleController = framework.Controller( )
foo.SampleController.prototype.handleClick =function( ) {
    this.element('status').text('clicked');
};
```

Figure 2:
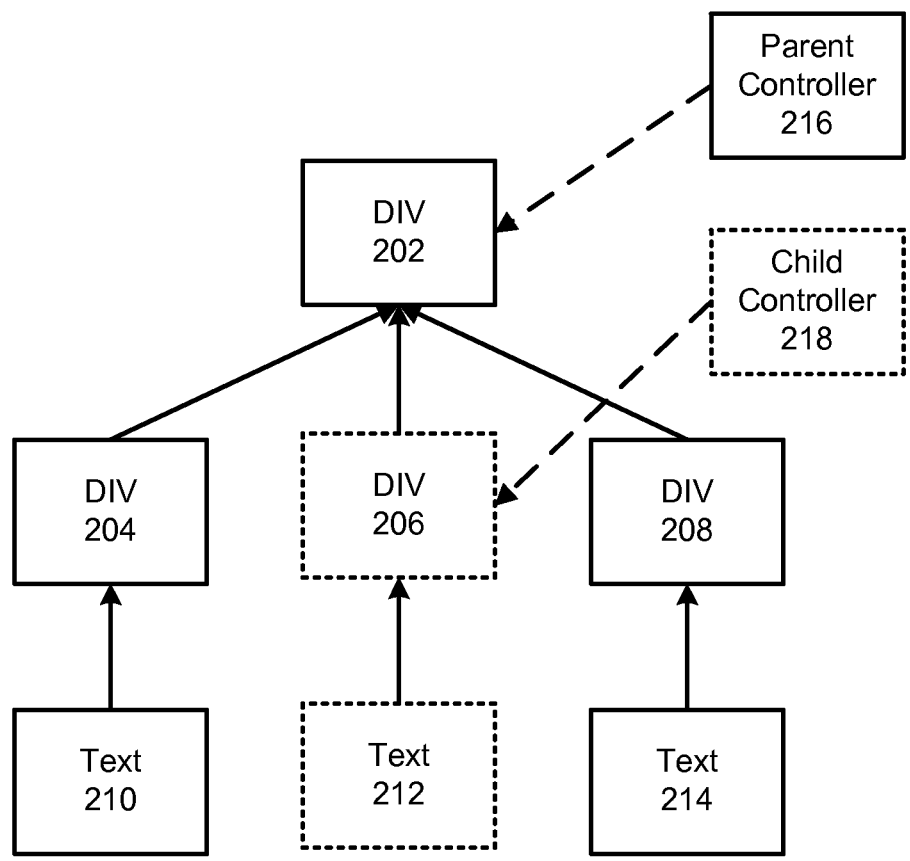
FIG. 2 is a flow chart for user interface frameworks in accordance with some implementations.

FIG. 2 shows a diagram of an example user interface framework environment 200 having a plurality of div elements, text elements and controllers. A parent controller 216 controls the subtrees for div 202, div 204 and div 208. A child controller 218 controls the DOM subtree of div 206.

The controllers (e.g., 216 and 218) are objects that manage subtrees of the DOM. The controller can be attached to a DOM element and is responsible for all the DOM nodes that are children of that element, except for portions that belong to a child controller.

Events that originate from within the DOM subtree may be handled by the controller. Events can be native browser events or application events coming from other controllers. When multiple controllers need to communicate and share data, the shared data can be placed into a separate data model object, which each controller has a reference to. The model object can contain business logic and can communicate with the server.

Figure 3:
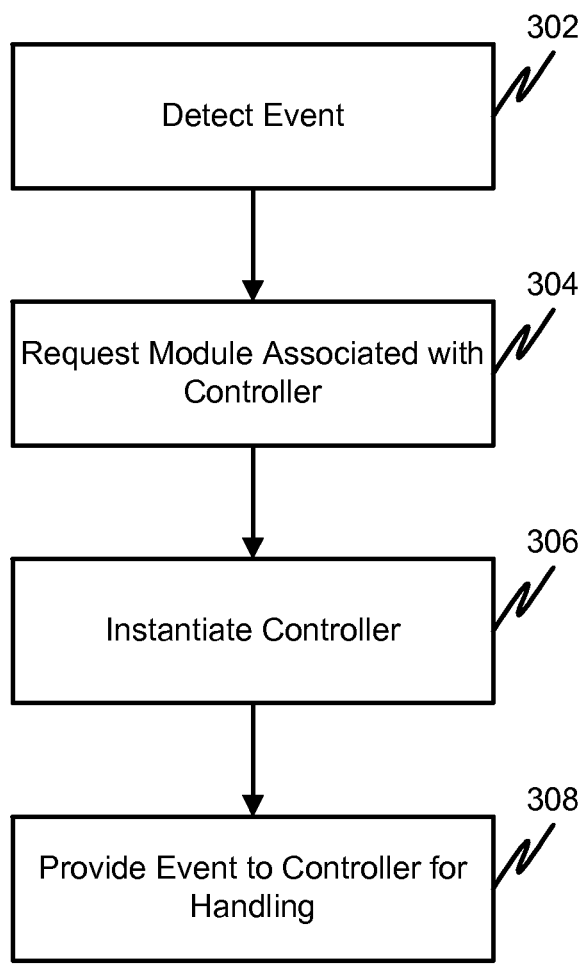
FIG. 3 is a flow chart showing an example method for user interface frameworks in accordance with some implementations.

FIG. 3 is a flow chart showing an example method 300 for user interface frameworks in accordance with some implementations. Processing begins at 302, where an event is detected from within a DOM node associated with a controller (e.g., via the declaration technique discussed herein). Events can include an event from a user interface element or an event from another controller. Processing continues to 304.

At 304, a module associated with the controller is requested. The module may be requested just prior to passing the event to the controller. Processing continues to 306.

At 306, the controller is instantiated and initialized. Processing continues to 308.

At 308, the event is provided to the controller for handing. It will be appreciated that 302-308 can be repeated in whole or in part in order to accomplish a contemplated UI task.

Figure 4:
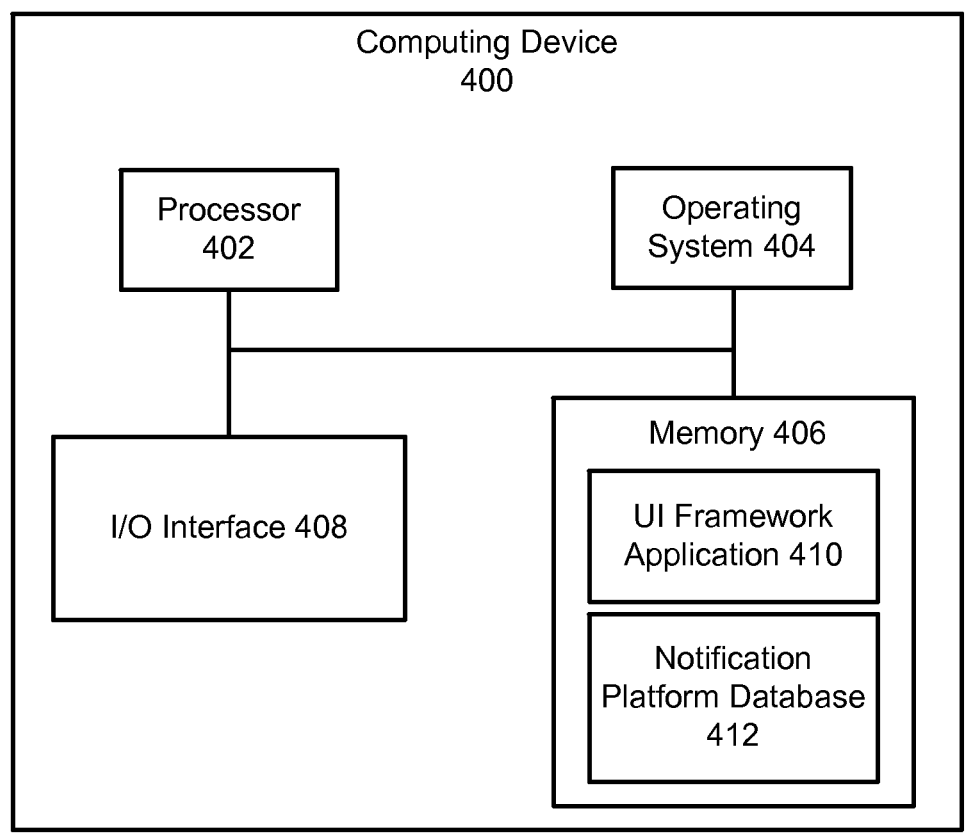
FIG. 4 is a diagram fan example computing device configured for user interface frameworks in accordance with some implementations.

FIG. 4 is a diagram of an example computing device 400 that can be configured for providing and/or executing user interface frameworks in accordance with some implementations. The computing device 400 includes a processor 402, operating system 404, memory 406 and I/O interface 408. The memory 406 can include a user interface framework application 410 and a database 412 (e.g., for storing names of components, controllers, events, data models or the like).

In operation, the processor 402 may execute the user interface framework application 410 stored in the memory 406. The user interface framework application 410 can include software instructions that, when executed by the processor, cause the processor to perform operations for providing and/ or executing a user interface framework in accordance with the present disclosure (e.g., the user interface framework application 410 can perform one or more of steps 302-308 described above and, in conjunction, can access the database 412). The user interface framework application 410 can also operate in conjunction with the operating system 404, and services, dispatchers, action handlers, events, document subtrees and data models (as shown in FIG. 1).

The user interface framework computing device (e.g., 400) can include, but is not limited to, a single processor system, a multi-processor system (co-located or distributed), a cloud computing system, or a combination of the above.

The client (or user) device(s) can include, but are not limited to, a desktop computer, a laptop computer, a portable computer, a tablet computing device, a smartphone, a feature phone, a personal digital assistant, a media player, televisions, an electronic book reader, an entertainment system of a vehicle or the like. Also, client/user devices can include wearable computing devices (e.g., glasses, watches and the like), furniture mounted computing devices and/or building mounted computing devices.

The user devices can be connected to a user interface framework server via a network. The network connecting user devices to the user interface framework server can be a wired or wireless network, and can include, but is not limited to, a WiFi network, a local area network, a wide area network, the Internet, or a combination of the above.

The data storage, memory and/or computer readable medium can be a nontransitory medium such as a magnetic storage device (hard disk drive or the like), optical storage device (CD, DVD or the like), or electronic storage device (RAM, ROM, flash, or the like). The software instructions can also be contained in, and provided as, an electronic signal, for example in the form of software as a service (SaaS) delivered from a server (e.g., a distributed system and/or a cloud computing system).

Some implementations of the disclosed method, system, and computer readable media can be implemented in software (e.g., as a computer program product and/or nontransitory computer readable media having stored instructions user interface frameworks as described herein). The stored software instructions can be executed on a programmed general purpose computer, a special purpose computer, a microprocessor, or the like.

It is, therefore, apparent that there is provided, in accordance with the various example implementations disclosed herein, systems, methods and computer readable media for user interface frameworks.

While the disclosed subject matter has been described in conjunction with a number of implementations, it is evident that many alternatives, modifications and variations would be or are apparent to those of ordinary skill in the applicable arts. Accordingly, Applicants intend to embrace all such alternatives, modifications, equivalents and variations that are within the spirit and scope of the disclosed subject matter.

What is claimed is:

1. A method comprising:
    detecting, at a dispatcher within a user interface framework, an event emitted from a user interface element contained within a document object model node associated with a controller, wherein the document object model node includes an attribute defining a module and specifying that the module be loaded prior to instantiating the controller;
    requesting the module associated with the controller;
    instantiating the controller, wherein instantiating the controller includes automatically constructing the controller in response to a first occurrence of the event; and
    providing the event to the controller.

2. The method of claim 1, wherein the controller is associated with the document object model node via a declaration in a mark-up language portion of document object code containing the node.

3. The method of claim 1, further comprising specifying the controller as optional, wherein when the controller is specified as optional and cannot be located by the user interface framework, the user interface framework does not raise an error based on the controller not being found.

4. The method of claim 1, wherein the controller can include one or more arguments passed to the controller when it is called, the arguments including one or more of:
    a statement in a declaration of the controller within code declaring the document object model node;
    a shared object within a data model accessible by controllers within the document object model; and
    a context.

5. The method of claim 1, wherein an instance of the controller is cached in a root node of the controller.

6. The method of claim 1, further comprising removing an instance of the controller when the document object model node is destroyed.

7. The method of claim 1, wherein the controller is declared in a template using a mark-up language or scripting language attribute.

8. A system comprising:
    one or more processors configured to perform operations including:
        detecting, at a dispatcher within a user interface framework, an event emitted from a user interface element contained within a document object model node associated with a controller, wherein the document object model node includes an attribute defining a module and specifying that the module be loaded prior to instantiating the controller;
        requesting the module associated with the controller;
        instantiating the controller, wherein instantiating the controller includes automatically constructing the controller in response to a first occurrence of the event; and
        providing the event to the controller.

9. The system of claim 8, wherein the controller is associated with the document object model node via a declaration in a mark-up language portion of document model object code containing the node.

10. The system of claim 8, wherein the operations further comprise specifying the controller as optional, wherein when the controller is specified as optional and cannot be located by the user interface framework, the user interface framework does not raise an error based on the controller not being found.

11. The system of claim 8, wherein the controller can include one or more arguments passed to the controller when it is called, the arguments including one or more of:
    a statement in a declaration of the controller within code declaring the document object model node;
    a shared object within a data model accessible by controllers within the document object model; and
    a context.

12. The system of claim 8, wherein the operations further comprise removing a controller instance when the document object model node is destroyed.

13. The system of claim 8, wherein the controller is declared in a template using a mark-up language or scripting language attribute.

14. A nontransitory computer readable medium having software instructions stored thereon that, when executed by a processor, cause the processor to perform operations comprising:
    detecting, at a dispatcher within a user interface framework, an event emitted from a user interface element contained within a document object model node associated with a controller, wherein the document object model node includes an attribute defining a module and specifying that the module be loaded prior to instantiating the controller;
    requesting the module associated with the controller;
    instantiating the controller, wherein instantiating the controller includes automatically constructing the controller in response to a first occurrence of the event; and
    providing the event to the controller.

15. The nontransitory computer readable medium of claim 14, wherein the controller is associated with the document object model node via a declaration in a mark-up language portion of document model object code containing the node.

16. The nontransitory computer readable medium of claim 14, wherein the operations further comprise removing an instance of the controller when the document object model node is destroyed.

17. The nontransitory computer readable medium of claim 14, wherein the controller is declared in a template using a mark-up language or scripting language attribute.

\* \* \* \* \*